Jan. 9, 1951  W. S. BRINK  2,537,624
TRUCK RIM DESIGN

Filed March 8, 1945  4 Sheets-Sheet 1

INVENTOR
WINFIELD S. BRINK
BY
ATTORNEYS

Jan. 9, 1951 W. S. BRINK 2,537,624
TRUCK RIM DESIGN
Filed March 8, 1945 4 Sheets-Sheet 2
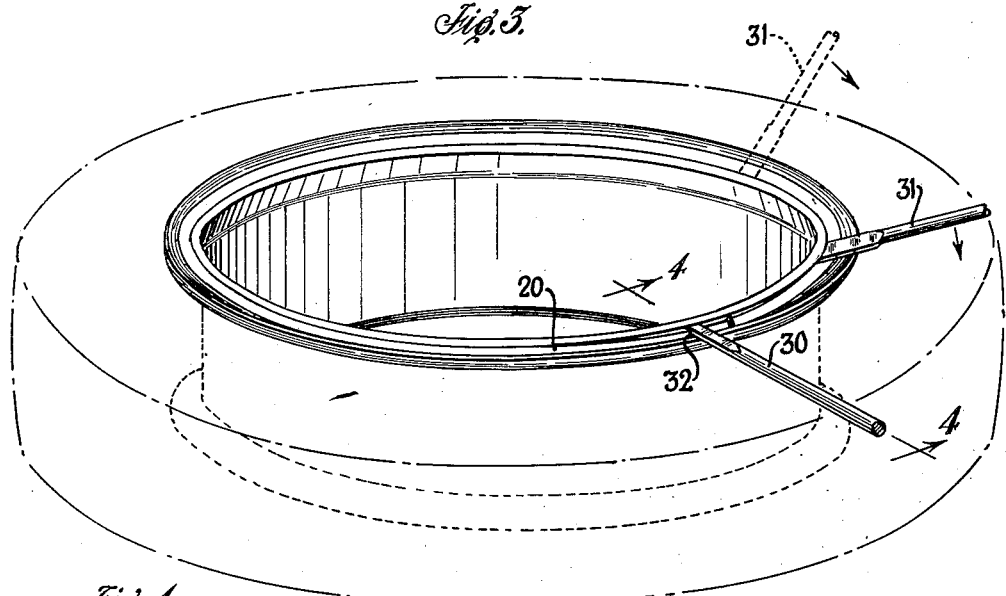
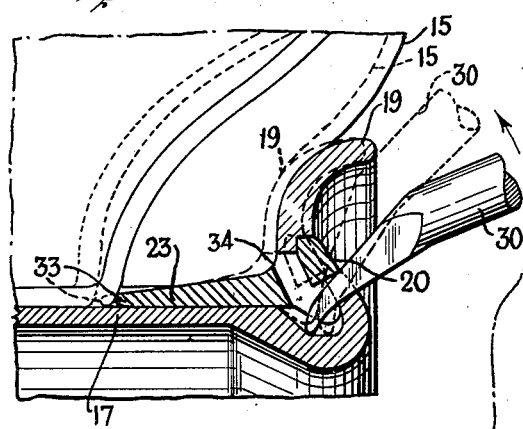
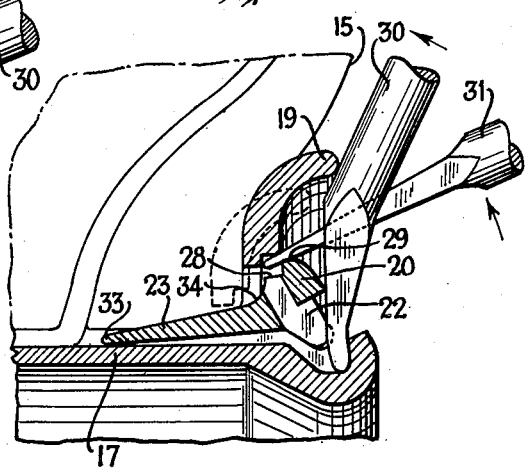
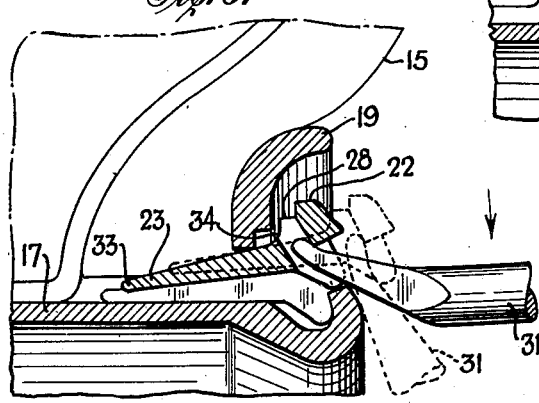
INVENTOR
WINFIELD S. BRINK
BY
ATTORNEYS Jan. 9, 1951  W. S. BRINK  2,537,624
TRUCK RIM DESIGN Filed March 8, 1945  4 Sheets-Sheet 3

INVENTOR
WINFIELD S. BRINK

BY  *Ely & Frye*

ATTORNEYS

Jan. 9, 1951 W. S. BRINK 2,537,624
TRUCK RIM DESIGN
Filed March 8, 1945 4 Sheets-Sheet 4
Fig. 11.
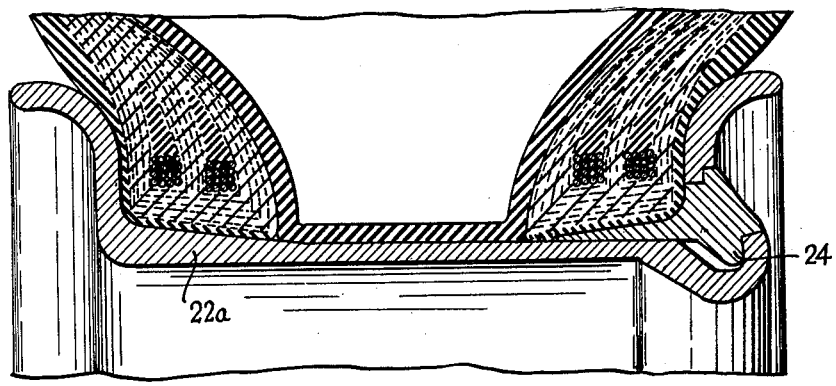
Fig. 9. Fig. 10.
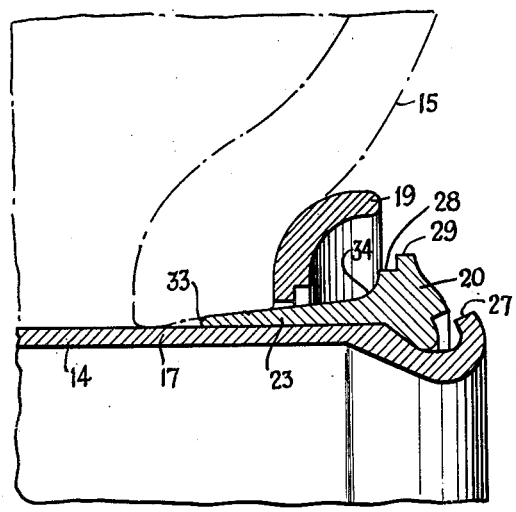 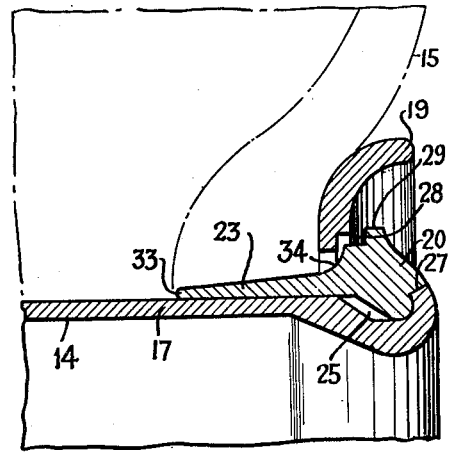
INVENTOR
WINFIELD S. BRINK
BY
ATTORNEYS Patented Jan. 9, 1951

2,537,624

UNITED STATES PATENT OFFICE 2,537,624

TRUCK RIM DESIGN

Winfield S. Brink, Akron, Ohio, assignor to The Firestone Tire & Rubber Company, Akron, Ohio, a corporation of Ohio Application March 8, 1945, Serial No. 581,650

4 Claims. (Cl. 152—410)

This invention relates to tire rims for use with pneumatic tires, and more especially it relates to truck tire rims on which are mounted tires which in service are subjected to low-inflation pressure.

The reduction of the inflation pressure in truck tires to a very low pressure when a vehicle on which such tires are mounted is to run over sand banks, soft beach sand, soft soil or the like has become a common practice. By reduction of the inflation pressure a larger tire footprint is obtained which improves the flotation quality of the tires and makes possible the movement of trucks through mud, sand, snow, soft soil, etc. It has been found that truck tires may be run without injury to the tires at a much lower inflation pressure in soft soil than on a hard surface. Thus, for example, an 11.00—18 tire should be inflated to approximately 60# for hard road surface, but may be reduced to approximately 12# inflation pressure when it is run in soft sand. Military amphibian ship to shore vehicles often are equipped with dashboard control of the tire inflation pressure so that the pressure may be changed according to the terrain encountered. This adaptation of truck tires for use in soft soil by the expedient of low tire inflation pressure has become a common practice. However, as will be understood by those familiar with the art, low inflation pressure in a truck tire on present rims permits creeping of the tire on its rim. Such creeping damages the tire bead and often causes the tube valve to become ruptured resulting in a flat tire.

An object of the present invention is to provide a tire rim having a detachable raised bead seat in cooperation with a detachable rim side ring wherein a tire bead fits tightly on the raised bead seat, and said bead seat fits tightly on the tire rim whereby a truck tire may run with low inflation pressure without danger of the tire creeping on its rim.

Another object of the invention is to provide a tire rim so constructed that tire creeping is prevented and the inflation of the tire on the rim causes the components of the rim to seat in such manner as to prevent the tire or rim ring from being blown from the tire rim.

A further object is to provide a rim which facilitates the mounting and demounting of tires.

Other objects and advantages of the invention will be apparent from a consideration of the following detailed description.

Referring to the accompanying drawings.

Figure 1:
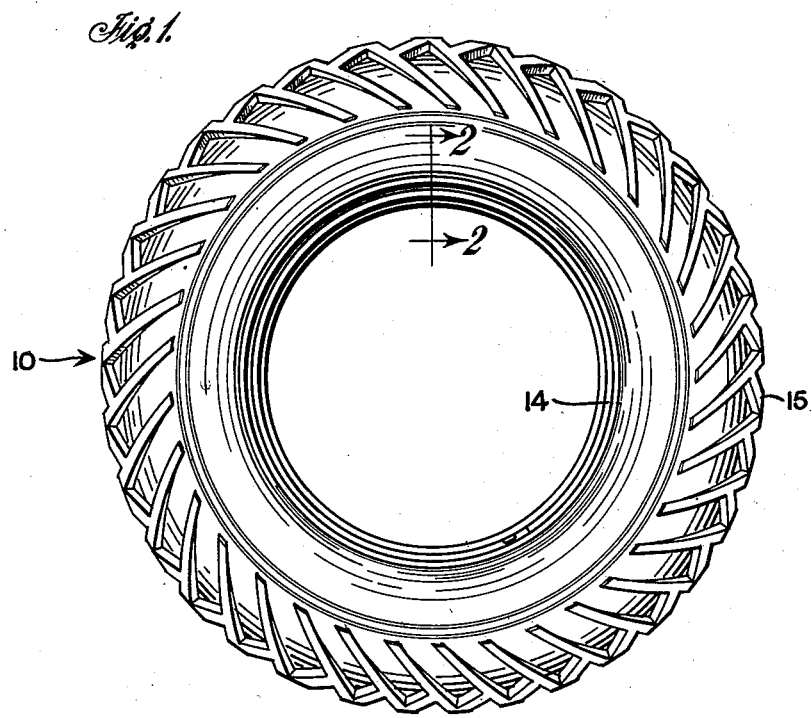
Fig. 1 is a side elevation of a vehicle wheel comprising the improved tire rim, in its preferred form, and an inflated truck tire mounted thereon.
Figure 2:
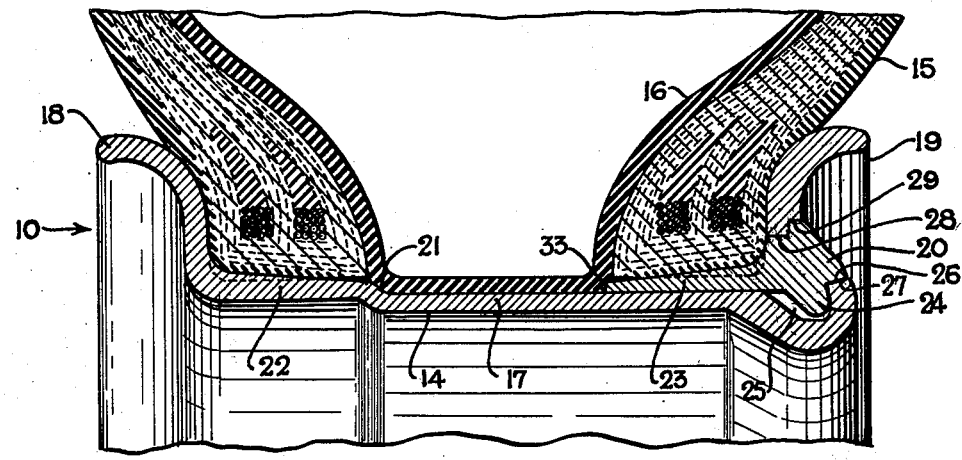
Fig. 2 is a section, on a large scale, taken on line 2—2 of Fig. 1.
Figure 7:
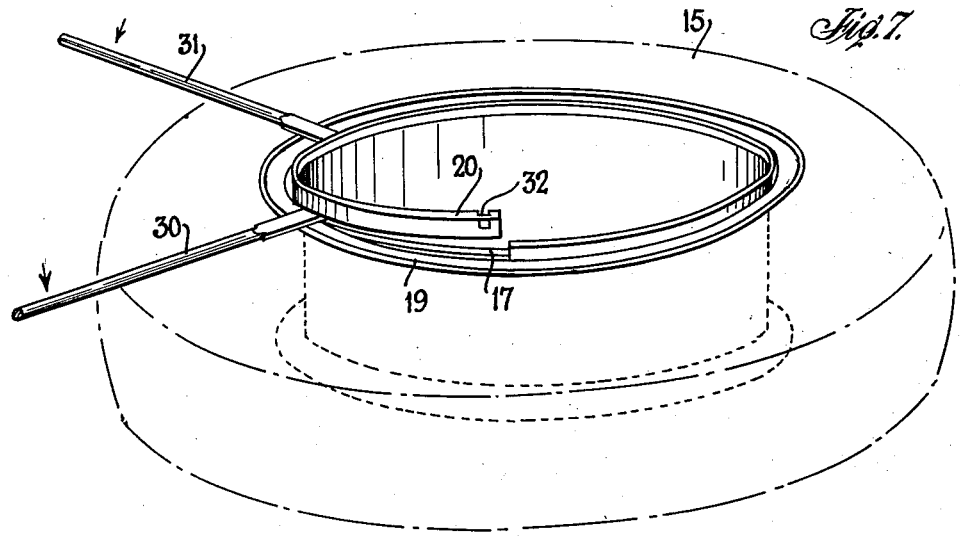
Figure 8:
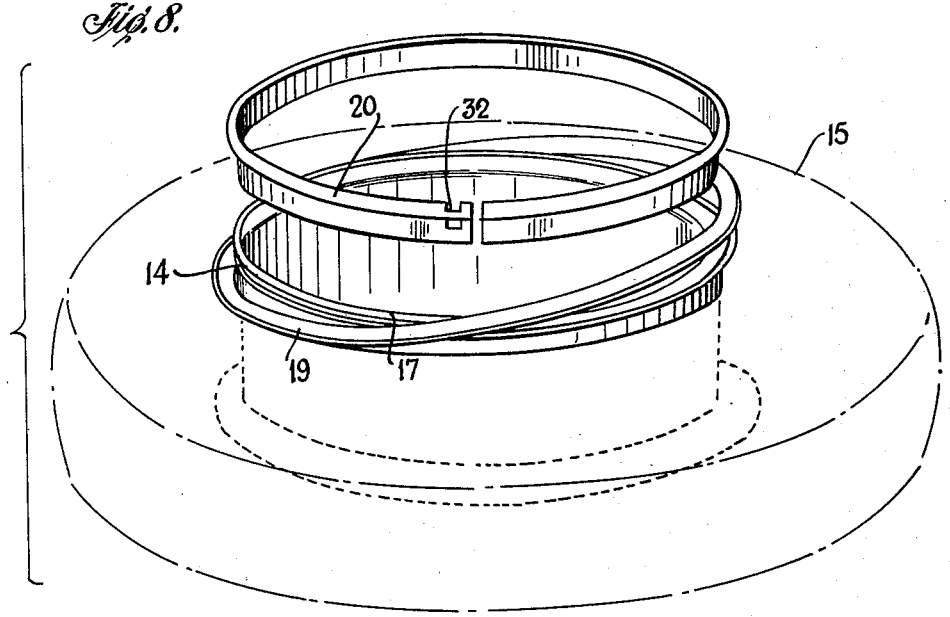

Figs. 3, 4, 5, 6, 7 and 8 are views illustrating the relative positions of the various parts of the assembly during various stages of removing a tire from a rim embodying the present invention; Fig. 3 is a perspective view of the tire and rim with the tire shown in outline; Figs. 4, 5 and 6 being diagrammatic sectional fragmentary views with the tire and tube shown in outline; Fig. 4 being taken on line 4—4 of Fig. 3; Figs. 5 and 6 being similar to Fig. 4 but illustrating different steps of demounting a tire; Figs. 7 and 8 are perspective views showing in outline somewhat diagrammatically further steps in the operation of demounting a tire;

Fig. 9 is a sectional view illustrating the relative position of the various components of the assembly shown in Fig. 1 when a tire is being mounted and just before tire inflation pressure is applied in the tire tube;

Fig. 10 is the same as Fig. 9 except that in Fig. 10 the assembly is shown just before the tire inflation pressure forces the components of the assembly into their operative positions shown in Fig. 2; and Fig. 11 illustrates the application of the side flange and tapered lock ring embodying the present invention as they appear applied to flat base truck rims now in use.

Referring more particularly to the drawings it will be seen that there is shown in Fig. 1 an assembly generally designated 10, comprising an improved straight side tire rim 14. The tire rim 14 carries a pneumatic tire 15, the latter including the usual inflatable inner tube 16.

As shown in Fig. 2, the tire rim 14 comprises a rim base 17, a peripheral, endless side flange 18 formed integrally with said base, and an endless, removable side flange 19 mounted upon a transversely split lock ring 20 which lock ring in turn is mounted upon the edge of said rim opposite said endless flange. The rim base 17 is of the flat base type being modified, however, by a stepoff 21 at the toe of the base of a sloped portion 22. The sloped portion 22 corresponds to the usual sloped portion of flat base truck rims, as will be seen by reference to the rim portion 22a of Fig. 11. These sloped portions are for the purpose of increasing the diameter of the bead seat portion of the rim in order to provide a tight bead fit. Thus the portion 22 of the rim is frustoconical shape with its largest diameter adjacent to the flange 18. While a tight tire bead fit to its rim is desirable, it has been the common practice heretofore to taper only one bead seat of truck tire rims since no satisfactory way was known whereby the toe of the tire bead last mounted could be started over the peripheral edge of the sloped portion of the rim. Applicant's invention provides means for obtaining a tight bead seat fit on both tire bead seats by providing the transversely split detachable lock ring 20 with a tapered or wedge portion 23 adapted to overlie the bead seat portion of the rim 14 opposite the flange 18. By reference to Figs. 2 and 11 it will be seen that the lock ring 20 also has a radially inwardly projecting portion 24 which in the completed assembly shown in Fig. 1 extends radially inwardly in a gutter or groove 25 of the rim 14. Said ring 20 also has an offset portion 26 which seats on a peripheral edge portion 27 of the rim 14 which edge portion 27 has a diameter no greater than the inside diameter of the beads of the tire 16. The ring 20 is additionally provided with means adapted to retain the tire flange 19 in operative position in service, this said means comprising a seat 28 and a radially outwardly projecting edge portion 29. It is to be noted that the edge portion 29 of the detachable locking ring is of substantially greater diameter than the tire bead seat; thus in operation a tire bead on said wedge portion 23 cannot pass over or blow off the locking ring 20. This feature is important as a safety factor since in mounting tires the flange 19 may sometimes be inadvertently omitted from the assembly in which case the person mounting the tire is protected against injury which would result from a truck tire blowing off a rim while being inflated. The flange 19 presents a continuous unbroken surface to the tire and accordingly no injury to the tire results as is the case where such flange has a transverse split. While the edge portion 29 of the split locking ring 20 has a diameter large enough to prevent a tire from blowing off the ring, yet the split in said locking ring does not contact the tire high enough above the tire bead to involve the extremely active part of the tire when the tire is being run in service. Thus it will be seen that tires run on applicant's rim will not be injured by the split in the locking ring.

The demounting of the tire 15 from rim 14 will now be described, reference being had to Figs. 1, 2, 3, 4, 5, 6, 7 and 8. As shown in Fig. 3 with the tire lying flat and the detachable locking ring 20 up, the end of a tire iron or tool 30 is manually inserted in a slot 32 in the ring 20. Next the handle of the tool 30 is pressed downwardly away from the axis of the tire thereby forcing the locking ring 20 and the flange ring 19 axially away from the groove 25 in the region adjacent the slot 32. Next two tire irons or tools 31 are employed to further force or break away the rings 20, 19 and the tire bead laterally of the rim away from the groove 25. As will be understood by those familiar with demounting tires, the tire tools 31 are successively placed ahead of each other in the crack or opening between the edge of the rim 14 and the locking ring 20, whereby the said rings and tire bead progressively are forced axially toward the center of the rim. After said rings and tire bead have been moved a distance permitted by the loose fit of portion 24 of ring 20 in rim groove 25 as illustrated in Fig. 4 the next step is to separate the rings 20 and 19. This is accomplished by inserting the tool 30 in the slot 32 and holding the tool against the endless flange ring 19 while the tool 31 is forced between the rings 20 and 19 as illustrated in Fig. 5. By using the two tools 31 in similar fashion as just mentioned in working rings 20 and 19 away from the groove 25 the lock ring is worked back toward said groove away from the flange ring 19. When the ring 19 has been worked off the seat 28 and edge 29 the ring 19 may or may not drop into the position indicated by the dotted lines of Fig. 5; however, when the ring 19 has been removed from its seat on ring 20 the ring 19 becomes a floating ring whose position with relation to the rim 14 readily is changed. With the ring 19 unseated the split locking ring may be removed from the assembly and it is to be particularly noted that this removal may be done while the endless flange ring 19 is radially outward of the wedge shaped portion 23 of the locking ring 20. By reference to Fig. 6 it will be seen that the inside diameter of the ring 19 is large enough to enable the inside diameter of the projected portion 24 of the locking ring to pass over the peripheral edge portion 27 of the rim 14. Applicant has made possible this removal of the locking ring from under the endless flange ring by the relative diameters of the rim edge 27, the inside and outside diameters of the portions 23, 24 and 29 of the ring 20, and the inside diameter of the flange ring 19. With one end of the locking ring raised out of position as shown in Fig. 7 the removed end may be grasped with a workman's hands and the ring 20 removed from the rim 14 after which the flange ring 19 is free to be removed as illustrated in Fig. 8. With rings 20 and 19 removed the tire and tube are readily removed from the rim 14. However, it should be noted that applicant's arrangement and design of the assembly parts is such as to provide substantial clearance between the inside diameter of the tire beads by removing the wedge portions 23 from under one tire bead and by the other tire bead moving away from its tapered bead seat thus providing ample clearance between tire beads and rim for easy removal of the tire. It will now be seen that by making it possible to remove locking ring 20 without forcing the ring 19 beyond the toe 33 of the tapered portion 23 that the bead of the tire need only to be broken loose from its seat on the tapered portion 23 and moved a very short distance toward the center of the rim in order to demount the tire, the tire being passed laterally off the rim over the peripheral edge 27.

In mounting a tire on rim 14 a tire with its uninflated tube 16 is placed on the rim with one bead of the tire forced well onto the sloped portion 22. The other tire bead is then pressed over the rim to a point which will permit the application of the locking ring 20 which because of its split construction may be passed over the rim portion 27 and buttoned and locked into position. Before the lock ring 20 is buttoned in, the flange 19 is placed in position against the sides of the tire as will be understood by those familiar with the art. After said rings are in position, the tube 16 is gradually inflated causing the tire beads to move laterally outwardly one tire bead seating on the sloped portion 22 of the rim base 17 and the other on the sloped or wedge portion 23 of the ring 20. At the beginning of the said inflation the flange 19 is only approximately centered in respect to the flange seat 29 of the ring 20. However, as the flange 19 approaches its seat if it is not centered in respect thereto the flange will contact the sloping surface of a fillet 34 of the locking ring 20 which acts as a centering means for said flange 19. As the inflation continues the flange 19 snaps into operative position.

after which the inflation is completed and the assembly is ready to be applied to a vehicle.

Modifications may be resorted to without departing from the spirit of the invention which therefore is to be limited only by the appended claims and the prior art.

What is claimed is:

1. In a tire rim, the combination of an annular rim-base comprising an integral side flange and an adjacent sloped tire bead seat formed integral therewith on one lateral margin of said rim-base, an annular gutter formed on the opposite lateral margin of said rim-base and a cylindrical bearing surface formed on said rim-base axially inwardly of said gutter, a removable endless side ring and a removable transversely split lock ring adapted to be mounted on the gutter margin of said rim-base, said removable side ring being adapted to seat upon and interlock with said lock ring and being movable laterally inwardly of said rim-base, said lock ring having an axially inwardly projecting portion having a radially outwardly facing sloped tire bead seat and a radially inwardly facing cylindrical surface adapted to contact and seat upon said cylindrical bearing surface of said rim-base, another portion of said lock ring projecting radially inwardly and loosely fitting into said gutter, said lock ring having still another portion projecting radially outwardly affording a side ring seat of greater diameter throughout than the sloped tire bead seat on the locking ring, said side ring seat being provided with a radial abutment for interlocking the said continuous removable side ring, said radially projecting portion enabling the side ring to be dropped onto said sloped tire bead seat, whereby the lock ring may be disengaged from said gutter by lifting a split end of the lock ring from said gutter.

2. A transversely split locking ring for a pneumatic tire rim having a detachable endless side flange, said ring having a thin wedge-shaped tire bead seat portion projecting axially therefrom, said projecting portion being adapted to detachably overlie and bear upon an edge portion of said tire rim for supporting a bead of a tire thereon, said ring also having a radially inwardly projecting portion adapted to project into a marginal gutter of said tire rim, said ring also having a radially outwardly projecting peripheral portion, said latter portion having a side flange seat formed thereon in a radially spaced relationship with respect to said tire bead seat portion, and a radial abutment adjacent said side flange seat, whereby said side flange seat and said radial abutment enable said detachable endless side flange to be seated in radial alignment upon said locking ring.

3. In a tire rim, the combination of an annular rim-base comprising a side flange, an adjacent sloped tire bead seat formed integrally with said rim-base, and a gutter formed on the opposite lateral margin of said rim-base, a removable endless side ring and a removable transversely split lock ring adapted to be mounted at said lateral margin of said rim-base opposite from said integral flange, said removable ring being movable laterally inwardly of said rim-base, said lock ring having a laterally projecting sloped tire bead seat portion adapted to overlie a marginal portion of said rim-base between said gutter and said integrally formed sloped portion, another portion of said locking ring projecting radially inwardly into said marginal gutter, said lock ring having still another portion projecting radially outwardly, said latter portion being provided with a seat adapted to receive said endless ring, said seat being spaced radially throughout its extent at a diameter greater than the largest diameter of said sloped tire bead seat portion, said endless ring being adapted to be held upon said seat by an inflated tire mounted on said rim, said seat having a radial abutment formed thereon, said radially outwardly projecting portion and said radial abutment thereon having an outside diameter sufficiently greater than the inside diameter of the beads of a tire of the size for which said rim is designed to prevent accidental blow-off of the tire bead if the side ring is inadvertently omitted from the assembly before tire inflation.

4. In a tire rim, the combination of an annular rim-base provided along one edge with a gutter, said gutter being bounded along its outer side by a radial flange, a removable transversely split lock ring provided with a radially inwardly projecting circumferentially extending portion adapted to engage said radial flange when said lock ring is in locking position in said gutter, said lock ring having an annular tapered tire bead seat formed thereon, said seat portion projecting axially from one side of the lock ring for a distance sufficiently great to engage and support substantially the entire inner surface of the bead of a tire mounted on said rim, and being adapted to overlie and in turn to be supported by said rim-base, said lock ring having a radially outwardly projecting portion provided with an annular side ring seat of greater diameter than said tire bead seat, a radially extending annular abutment on said side ring seat, and a continuous removable side ring adapted to be mounted on the side ring seat of said split lock ring and adapted to be held in radial alignment by said radially extending annular abutment.

WINFIELD S. BRINK.

REFERENCES CITED

The following references are of record in the file of this patent:

UNITED STATES PATENTS

| Number | Name | Date |
| --- | --- | --- |
| 1,171,502 | Burgess | Feb. 15, 1916 |
| 2,265,562 | Jacobi | Dec. 9, 1941 |

FOREIGN PATENTS

| Number | Country | Date |
| --- | --- | --- |
| 102,999 | Austria | 1926 |
| 360,090 | Italy | 1938 |